Jan. 3, 1967   C. DELPORTE   3,295,363
HARDNESS-TESTING SYSTEM
Filed Oct. 31, 1963   3 Sheets-Sheet 1
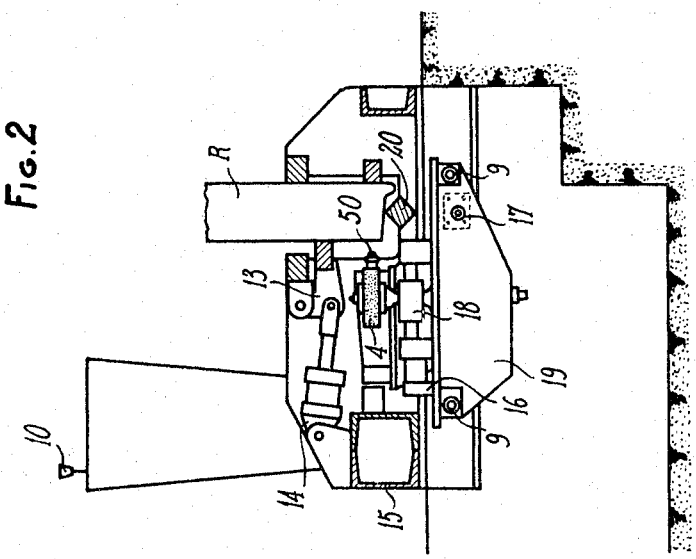
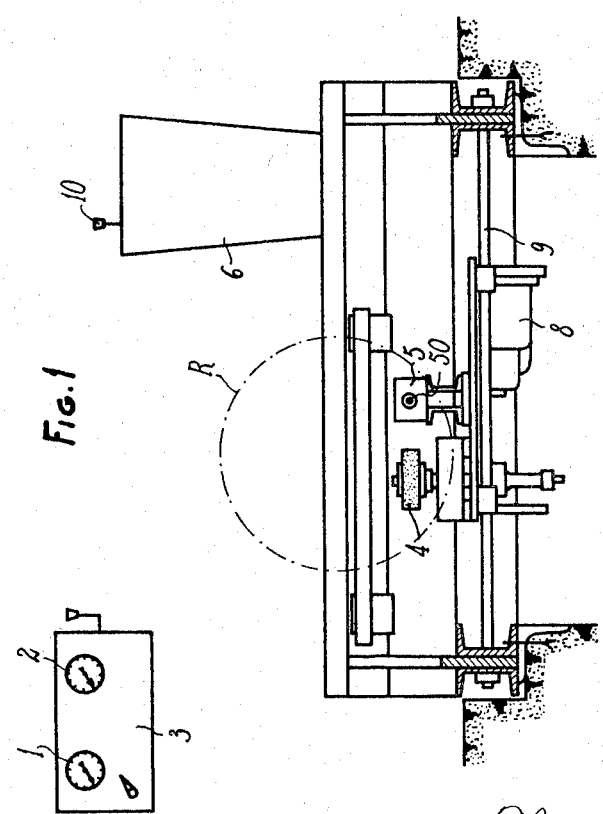
Claude Delporte,
Inventor
By Wenderoth, Lind and Ponack,
Attorneys Jan. 3, 1967  C. DELPORTE  3,295,363

HARDNESS-TESTING SYSTEM

Filed Oct. 31, 1963  3 Sheets-Sheet 2

Jan. 3, 1967  C. DELPORTE  3,295,363
HARDNESS-TESTING SYSTEM
Filed Oct. 31, 1963  3 Sheets-Sheet 3

United States Patent Office 3,295,363
Patented Jan. 3, 1967

3,295,363
HARDNESS-TESTING SYSTEM
Claude Delporte, Malo-les-Bains, Nord, France, assignor to Compagnie des Ateliers et Forges de la Loire (St. Chamond-Firminy-St. Etienne-Jacob-Holtzer), Paris, France
Filed Oct. 31, 1963, Ser. No. 320,424
Claims priority, application France, Nov. 16, 1962, 915,634, Patent 1,348,463
10 Claims. (Cl. 73—81)

This invention relates to apparatus for testing the hardness of metal parts. Hardness-testing, by such methods as the Brinell, Rockwell, or equivalent tests, is standard procedure in the production and utilization of metallic parts as a measure of the mechanical characteristics of the constituent metal. Such a test generally involves two main steps: first grinding a small surface area on the part to be tested to provide a flat, smooth surface; then pressing a steel-ball indenter of standard dimensional and hardness characteristics into the test area thus prepared under a prescribed load to produce an indentation or imprint. The size of this imprint serves as a measure of the hardness of the part.

Where hardness tests have to be performed on a great number of comparatively large and heavy parts at a fast rate, rather serious handling problems may be encountered, and it is a general object of this invention to solve these problems in a complete, efficient manner. The invention was especially developed in connection with the individual testing of rolling-stock wheels as prescribed by the specifications of the French National Railroads; similar individual hardness tests for railroad vehicle wheels are currently specified in various other countries. While the invention will be disclosed hereinafter with especial reference to this particular application, it is to be understood that such reference imposes no limitation on the scope of the invention, since the apparatus according to the invention would be readily adaptable for the testing of parts other than wheels.

Objects of this invention include the provision of a complete system for performing the steps involved in the hardness testing of a series of metal parts of the kind specified at a rapid rate and in automatic manner; the provision of such a system including means for blocking each successive test part in position, means for grinding a test area on the part, and means for applying a standard indenter to the ground test area; the provision of improved control and monitoring means whereby said steps will be cyclically performed in the requisite sequence with a minimum of human intervention and with maximum efficiency and reliability. Other objects will appear.

The invention will now be described in a preferred embodiment as illustrated in the accompanying drawings, wherein:

FIG. 1 is a simplified view of a hardness-testing machine according to the selected embodiment in side elevation;

FIG. 2 is an elevational view, partly in section, on a vertical plane at right angles to that of FIG. 1 and from the left thereof;

Figure 3:
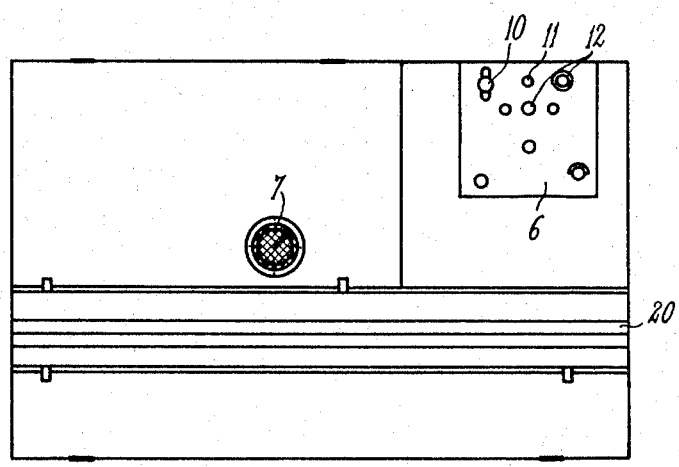
FIG. 3 is a corresponding view in overhead plan.

Referring to the drawings, the machine illustrated comprises a frame preferably of welded construction, generally designated 15, bolted to heavy sectional steel members bedded in suitable concrete foundations. The frame 15 may be provided with readily removable casing means for protecting the mechanical components thereof presently described while providing quick access thereto.

Means are provided for blocking a test part, here shown as a rolling-stock wheel R, in vertical position relative to the frame, and these means include a blocking member 13 pivotally connected to the outer ends of the piston rods of a pair of pneumatic ram actuators 14 (only one of which is visible in FIG. 2), the actuator cylinders being pivotally attached to the frame 15. The blocker member 13 acts in the extended condition of the actuator rods to engage one side of the wheel R thereby blocking its opposite side against suitable fixed surfaces of the frame. The wheel R is shown as resting with its base upon an edge of a sectional member 20 secured to the frame and over which the wheel R can be rolled in the retracted condition of the blocker member 13 to move the wheel into and away from its operative position at the testing station.

A carriage 19 is movable longitudinally of the frame 15 on a pair of guideways 9 secured to the frame 15, e.g. bolted thereto as shown, and a pneumatic actuator 17 connected at one end to the frame and at its other end to carriage 19 is provided for reciprocating the carriage relative to the frame along the ways 9. The carriage 19 supports thereon a grinder-carrier 18 for transverse reciprocation across the carriage 19 towards and away from the side of wheel R, the carrier 18 in turn supporting a grinder wheel 4 rotatable about a vertical axis, and drive means therefor (not shown), which drive means in the present example may comprise a pneumatic motor. The grinder carrier 18 with grinder 4 thereon is traversable across carriage 19 by means of a pneumatic actuator 16 having one end connected to the carriage and another end connected to the carrier.

Carriage 19 further supports a ball-type indenter 50, of standard type, carried at the outer end of an actuator rod projectable from a hydraulic indenter-actuator 5 secured on carriage 19, the indenter 50 being engageable with the side of wheel R. Carriage 19 also supports additional equipment, including a pressure gauge 7 connected with indenter actuator 5 for indicating the indenting pressure load, an air-oil pressure-booster or compressor 8 for supplying operating oil pressure to indenter-actuator 5, as well as certain components of the electro-pneumatic control system presently described with reference to FIG. 4.

A control desk 6 comprises a casing secured to the top of frame 15 and containing other components of said control equipment including especially the electrically actuated valves controlling fluid flow to the grinder and indenter actuators. Disposed on the upper surface of control desk 6 are manual controls which include a lever 10 operable for blocking and releasing a wheel R in and from testing position, by way of the blocker actuator 14, and one (or a pair of) start buttons 12. A safety button 11 is preferably provided for cutting off the power and thereby instantly arresting the operation of the machine in case of an abnormal condition. A set of control lamps is also provided on desk 6, and includes four lamps in this example, which are respectively lighted to indicate the following stages of the operating sequence: pressure applied, grinding in progress, ball-test in progress, and cycle completed.

A box 3, shown in FIG. 1 as being separate from control desk 6 but which may form part of it, contains electrical equipment including a pair of conventional electric or electronic timing devices 1 and 2, which are presettable selectively to predetermined periods of time corresponding to the desired durations of the grinding and indenting operations respectively. Box 3 further contains electrical equipment involved in the operation of the electro-valves controlling the actuators and the safety stop control, electrically interconnected with the related equipment in control desk 6.

Figure 4:
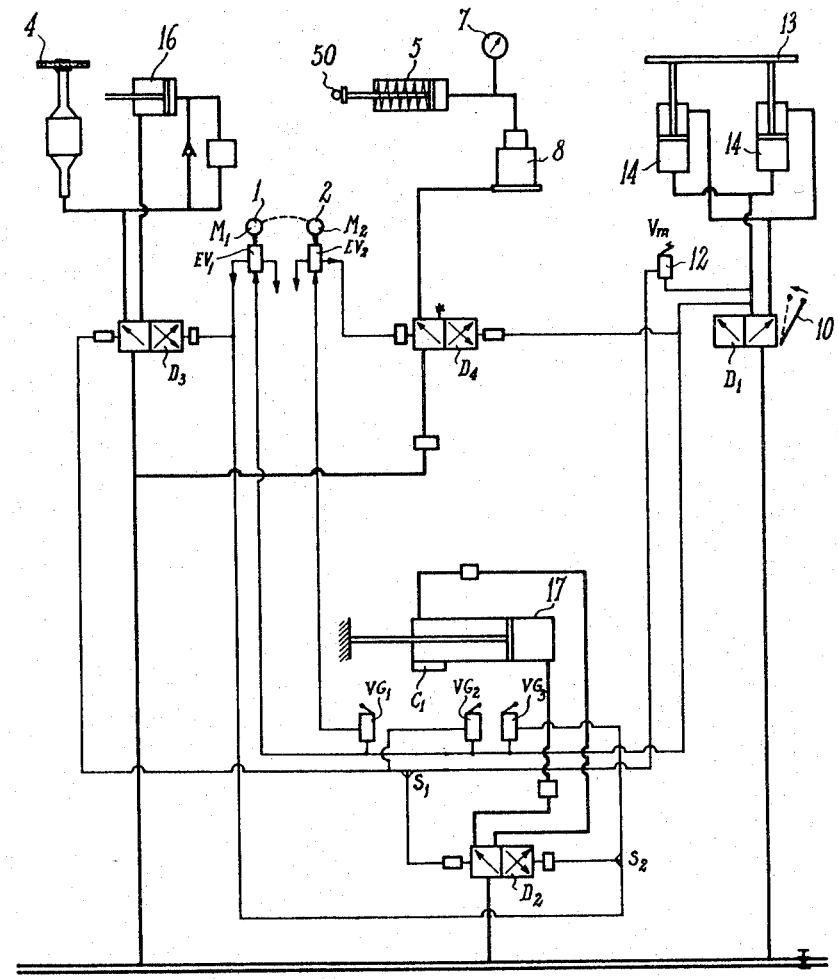
FIG. 4 is a diagram of a pressure-fluid control system usable with the apparatus of the foregoing figures.

Referring now to FIG. 4, the control system there diagrammatically illustrated includes a showing of various actuators and other components previously referred to and readily identifiable by their reference numbers. The system further includes an air pressure supply line shown at the bottom of the diagram, and the following chief further components, the functions of which will first be indicated in a general way and will be more precisely understood from the description to follow.

The system includes four air distributor valves D1, D2, D3 and D4. D1 is the distributor supplying air to the wheel-blocking actuator 14 for blocking and releasing the wheel R, on manual actuation of lever 10. D2 selectively supplies and exhausts air to and from the respective ends of actuator 17 for traversing the carriage 19 in one or the opposite sense. A pair of selectors S1 and S2 connected to distributor D2 can apply an air pulse to actuate said distributor to one or the other of its positions in which it directs air from the pressure supply line (at bottom of the diagram) to a related end of actuator cylinder 17. Distributor D3 supplies compressed air both to the air motor driving grinder wheel 4, and to the actuator 16 which controls the traversing reciprocation of the grinding-wheel carrier 18 towards and from the test part R. This distributor D3 is actuated to one position, that in which it applies air to actuator 16 for advancing the grinder-carrier 18 towards wheel R and applies air to the grinder drive motor for rotating grinder 4, by an air pulse applied thereto from a relay valve $Vm$ actuated on depression of a start button 12; and said distributor D3 is actuated to its reverse position, that in which it applies air to actuator 16 for retracting the grinder-carrier 18 and cuts off the supply of air to the grinder drive motor, by an air pulse applied thereto from an electro-valve EV1, later referred to.

Distributor D4 controls the supply of air to oil compressor 8 operating the indenter actuator 5. An air pulse applied to one side of distributor D4 from, an electro-valve EV2, later referred to, actuates the distributor to the position in which it causes compressor 8 to expand oil-actuator 5 for impressing the indenter 50 into the test piece, while an air pulse applied to the opposite side of distributor D4 in a manner to be described, actuates said distributor to its reverse position in which it exhausts to atmosphere, whereupon a spring associated with actuator 5 retracts the indenter. Electro-valves EV1 and EV2 are placed under the control of the timer devices M1 and M2 respectively.

The system further includes three cam-actuated relay valves VG1, VG2 and VG3, actuated by a cam C1 projecting from carriage 19 and adapted to engage said valves in succession during the reciprocation of the carriage along the ways 9.

The operation of the control system just described and that of the hardness-testing system as a whole will be understood from the following description of an operating cycle of the machine.

The cycle can be considered as commencing when the operator, after inserting a wheel R into the testing station by any suitable means, actuates lever 10 to block the wheel R in position. This actuation of lever 10 moves distributor D1 to a position in which it allows compressed air from the supply line (at the bottom of the figure) to pass through the distributor to the lower ends (as shown) of the actuators 14, whereby to expand the wheel blocker member 13 to block the wheel against the frame surfaces in the position shown in FIG. 2.

This displacement of distributor D1 by lever 10 simultaneously applies compressed air from the pressure supply line to the inlets of relay valves $Vm$, VG1, VG2 and VG3, and to electro-valve EV1. Moreover, in the initial position of the carriage 19, its cam C1 is engaging the actuating lever of relay valve VG1, thereby retaining said valve in an open position in which it allows air to pass from distributor D1 to the inlet of electro-valve EV2. Thus, valves $Vm$, VG1, VG2, VG3, EV1 and EV2 all have pressure air applied to their inlets after lever 10 has been actuated to block a wheel R at the testing station.

The operator now depresses start button (or buttons) 12 to initiate the automatic operating sequence. Depression of button 12 opens relay valve $Vm$ whereby compressed air from its inlet is passed via selector S1 to actuate distributor D2 to that position in which it displaces carriage actuator cylinder 17 in the rightward direction as here shown. Cam C1 thereupon disengages valve VG1, which moves to closed position. As the carriage 19 advances, cam C1 engages the actuating lever of relay valve VG2, actuating the valve to open position. Compressed air is now passed from the inlet of this valve to apply an air pulse to the left side (as shown) of distributor D3, moving this latter to the position in which it allows air to pass from the pressure line to the drive motor of grinder 4 and to the right side (as shown) of actuator 16 to advance the grinder towards the test piece R. Electrovalve EV1 at this time is closed by depression of start button 12 (or the other of the pair of buttons 12) so that air from its inlet is not allowed to be applied to the right side of distributor D3. Thus, actuator 16 is moved to advance grinder-carrier 18 towards the test piece R, and grinder wheel 4 is at the same time driven in rotation, so that as carriage 19 advances grinder 4 grinds an elongated surface area on the wheel R.

On continued advance of carriage 19, cam C1 disengages valve VG2 to close this valve and ultimately engages the valve VG3, moving it to open position. A pulse of air is thereupon applied from the inlet of this valve and through selector S2, to the right side of distributor D2, actuating this distributor to its reverse position in which it applies air to the left side of actuator cylinder 17, while exhausting the right side of it, so that the sense of displacement of said cylinder and hence of carriage 19 is reversed, and the carriage starts a return traverse (leftward according to FIG. 4). During this return traverse of the carriage 19, grinder 4 remains in engagement with the surface of wheel R, continuing its grinding action thereon. When, during this return traverse of the carriage 19, cam C1 reengages cam actuated valve VG2, this valve is again opened to reapply an air pulse through selector S1 to the left side of distributor D2, thereby again reversing the sense of displacement of carriage 19 and grinder 4.

Thus a to-and-fro reciprocation of the carriage 19 and of grinder 4 in contact engagement with the wheel R proceeds in the way just described for a time determined by the setting of timer device M1. When the preset time period has elapsed, timer M1 actuates electro-valve EV1 to open condition, allowing an air pulse to pass to the right side of distributor D3. This cuts off the supply of air to the drive motor of grinder 4 and applies air to the left side of actuator 16 to retract the grinder-carrier 18 away from the wheel R. At the same time, timer M1 on terminating its operation initiates the operation of timer M2.

Throughout the period of operation of timer M1 a "grinding-stage" control lamp on control desk 6 remained lighted. This lamp is now extinguished while the lamp indicating the "ball-test" stage is illuminated in turn.

The opening of electro-valve EV1 as just described simultaneously applies an air-pulse through selector S2 to the right side of distributor D2, so that actuator cylinder 17 and carriage 19 recedes leftward until cam C1 engages valve VG1, opening this valve. Disengagement of both valves VG1 and VG2 by cam C1 cuts off the air supply from both ends of actuator cylinder 17 so that the carriage 19 now remains stationary at its initial position. An air pulse is applied through valve VG1 and electro-valve EV2, now open, to the left side of distributor D4, which thereupon allows compressed air to pass from the pressure line to oil-compressor 8, which is turn supplies oil under pressure to the hydraulic actuator 5. This actuator is expanded to project ball-indenter 50 into the ground surface of the wheel R, at a prescribed pressure as indicated by gauge 7.

The indicator lamp indicating "ball-test in progress" has been lighted up at the instant timer M2 has been placed in operation and opened electro-valve EV2, while the "grinding stage" lamp has simultaneously been extinguished.

The indentor 50 is forced by actuator 5 into the surface of the wheel R and remains in projected condition for a time determined by the setting of timer M2. Aftre the preset time has elapsed, timer M2 acts to close electro-valve EV2, simultaneously extinguishing the "ball-test" indicator lamp and lighting the "end-of-cycle" lamp. Closure of electro-valve EV2 by timer M2 causes distributor D4 to move to a position in which the air inlet to oil-compressor 8 is connected to atmosphere, so that hydraulic actuator 5 is allowed to move to retracted position by its spring, retracting the ball-indenter 50 from the wheel R. The automatic test cycle is now terminated.

The operator now actuates lever 10 to displace distributor D1 to its reverse position in which it supplies air to the upper ends (as here shown) of actuators 14, thereby retracting blocking member 13 and releasing the tested wheel R. The tested wheel R is removed from the machine by rolling it along the rail 20, manually or preferably by gravity, and a fresh wheel may be introduced in its place by similar means for a further hardness test.

It will be apparent from the foregoing description that the invention has provided a highly effective and yet simple system whereby hardness-testing operations can be performed at a fast pace on a series of heavy parts such as wheels, in a substantially fully automatic manner, with a minimum of human intervention and under strictly uniform, controlled conditions. A large number of changes and modifications may be introduced into the single exemplary embodiment illustrated and described without exceeding the scope of the invention. Various components of the operating and control means, described herein as pneumatic, may instead be provided electrical, hydraulic or mechanical if preferred.

What I claim is:

1. A system for serially hardness-testing a metal part, comprising a frame, blocking means displaceable on said frame engageable with said part to block said part relative to said frame, a carriage reciprocable on said frame in a longitudinal direction generally parallel to a surface of said part, a first actuator means for reciprocating said carriage, grinder means supported on said carriage for longitudinal reciprocation therewith and for transverse movement into and out of engagement with said surface, a second actuator means for moving said grinder means relative to said carriage; an indenter device supported on said carriage for longitudinal reciprocation therewith and for transverse movement into and out of engagement with said surface, a third actuator means for moving said indenter device relative to said carriage, a power source, control means connected with said power source and a fourth actuator means sequentially operable for operating said first actuator means and said second actuator means to grind a test area on said surface and then operating said third actuator means for actuating said indenter device to indent said ground test area for making a hardness test.

2. A system for serially hardness-testing a part, comprising a frame, blocking means displaceable on said frame engageable with said part to block said part relative to said frame, grinding means reciprocable on said frame in a longitudinal direction parallel to said surface of said part blocked thereon and movable in a transverse direction towards and away from said surface, an indenter device movable on said frame in a transverse direction into and out of engagement with said surface, first, second and third actuator means respectively connected for longitudinally reciprocating said grinding means, transversely moving said grinding means and transversely moving said indenter device, a pre-settable timer device, a power source, control means connected with said power source, timer device and said first, second and third actuator means operable for operating said second actuator means to move said grinding means transversely towards said surface and operating said first actuator means to reciprocate said grinding means parallel to said surface for a time period as pre-set by said timer device to grind a test area on said surface, and then operating said third actuator means for moving said indenter device into and out of engagement with said ground test area to indent said area for making a hardness test.

3. The system as claimed in claim 2 including a second pre-settable timer device, means connecting said second timer device with said first timer device and with said control means whereby said indenter device will be moved into engagement with said test area for a second time period as preset with said second timer device.

4. The system as claimed in claim 2, including a fourth actuator means for displacing said blocking means into and out of blocking relation with said part on said frame, manual means connected to said power source and said fourth actuator means operable for moving said blocking means into and out of blocking relation with said part, and means connecting said control means with said manual means for operating said first, second and third actuating means in sequence after said manual means has been operated to block said part.

5. The system as claimed in claim 2, including a carriage reciprocable relative to said frame in a longitudinal direction parallel to said surface, and wherein said grinding means and indenter device are supported on said carriage for longitudinal reciprocation therewith and transverse movement with respect thereto, and said first actuator means comprises means connected for longitudinally reciprocating said carriage relative to said frame.

6. The system as claimed in claim 1, wherein said power source comprises a source of fluid pressure and said first, second, third and fourth actuator means comprise fluid pressure actuators.

7. The system as claimed in claim 1, wherein said power source comprises a source of air pressure and an oil compressor, and said first and second actuator means comprise pneumatic actuators and said third actuator means comprises an hydraulic actuator.

8. A system for serially hardness-testing a part, comprising a frame, blocking means displaceable on said frame engageable with said part to block said part relative to said frame, a grinding head reciprocable on said frame in a longitudinal direction parallel to a surface of said part and movable in a transverse direction into and out of engagement with said surface, an indenter device movable on said frame in a transverse direction into and out of engagement with said surface, first, second and third actuators respectively connected for longitudinally reciprocating said grinding head, transversely moving said grinding head and transversely moving said indenter device, a power source, control means connected with said power source and said first, second and third actuators sequentially operable for first moving said grinding head into engagement with said surface, then reciprocating said grinding head parallel to said surface while in engagement therewith for a first predetermined time period for grinding a test area on said surface, then moving said grinding head out of engagement with said surface, then moving said indenter device into engagement with said ground surface area for a second predetermined time period for indenting said area to make a hardness test, and thereafter moving said indenter device out of engagement with said surface area.

9. The system as claimed in claim 8, including first and second timer devices in said control means separately presettable for predetermining said first and second time periods.

10. The system as claimed in claim 9, including indicator lights connected with said timer devices illuminated respectively throughout said first and said second time periods.

References Cited by the Examiner
UNITED STATES PATENTS 2,259,840  10/1941  Smith _____ 73—78

RICHARD C. QUEISSER, *Primary Examiner.*
EDWARD D. GILHOOLY, *Assistant Examiner.*